（12） United States Patent
Cheng et al.

(10) Patent No.: US 8,049,835 B2
(45) Date of Patent: *Nov. 1, 2011

(54) FLAT PANEL DISPLAY MODULE WHEREIN THE UPPER AND LOWER SIDE WALLS OF THE FIXING PLATE ARE CONTACTED WITH THE SIDE WALLS OF THE UPPER AND LOWER BEZELS RESPECTIVELY

(75) Inventors: Chung-Hao Cheng, Hsin-Chu (TW); Che-Chih Chang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/010,764

(22) Filed: Jan. 20, 2011

(65) Prior Publication Data

US 2011/0116002 A1    May 19, 2011

Related U.S. Application Data

(63) Continuation of application No. 11/679,184, filed on Feb. 27, 2007, now Pat. No. 7,924,360.

(30) Foreign Application Priority Data

Dec. 6, 2006  (TW) .............................. 95145469 A

(51) Int. Cl.
  *G02F 1/1333*  (2006.01)
  *H04N 5/64*    (2006.01)
  *H05K 5/00*    (2006.01)
  *H05K 7/00*    (2006.01)
  *G06F 1/16*    (2006.01)

(52) U.S. Cl. ...................... 349/58; 348/836; 361/679.58
(58) Field of Classification Search ............. 349/58–60; 348/836; 361/679.57–679.58
See application file for complete search history.

(56) References Cited

U.S. PATENT DOCUMENTS

| 6,292,239 | B1 | 9/2001 | Nagamura |
| 2004/0246397 | A1 | 12/2004 | Kang |
| 2004/0263713 | A1 | 12/2004 | Takata |
| 2005/0151895 | A1* | 7/2005 | Fukuyoshi et al. ............. 349/58 |
| 2005/0195460 | A1 | 9/2005 | Fujimori |

(Continued)

FOREIGN PATENT DOCUMENTS

JP    2004258280    9/2004

(Continued)

*Primary Examiner* — Mark Robinson
*Assistant Examiner* — Dennis Y. Kim
(74) *Attorney, Agent, or Firm* — Winston Hsu; Scott Margo

(57) ABSTRACT

A display module includes a planar display panel being a liquid crystal display panel, a frame disposed under the planar display panel, a lower bezel disposed outside the frame, an upper bezel disposed outside the planar display panel, and a back light module disposed inside the frame. The frame includes at least one side wall. The outer surface of the side wall includes a plurality of tenons and a fixing plate is coupled to the side wall. The fixing plate is contacted with a side of the planar display panel. The side wall of the lower bezel includes a first hole corresponding to a first tenon so that the first tenon can be engaged with the first hole. The side wall of the upper bezel includes at least one second hole corresponding to a second tenon so that the second tenon can be engaged with the second hole.

21 Claims, 8 Drawing Sheets

U.S. PATENT DOCUMENTS

| | | |
|---|---|---|
| 2006/0103774 A1* | 5/2006 | Han et al. .................. 349/58 |
| 2006/0139962 A1* | 6/2006 | Shin et al. .................. 362/633 |
| 2006/0203141 A1 | 9/2006 | Lee |
| 2006/0290836 A1 | 12/2006 | Chang |

FOREIGN PATENT DOCUMENTS

| | | |
|---|---|---|
| JP | 2005121929 | 5/2005 |

\* cited by examiner ically in the various figures and draw-# FLAT PANEL DISPLAY MODULE WHEREIN THE UPPER AND LOWER SIDE WALLS OF THE FIXING PLATE ARE CONTACTED WITH THE SIDE WALLS OF THE UPPER AND LOWER BEZELS RESPECTIVELY

CROSS REFERENCE TO RELATED APPLICATIONS

This application is a continuation of U.S. application Ser. No. 11/679,184, filed on Feb. 27, 2007, which is based upon and claims benefit of priority from the prior Taiwan Patent Application No. 095145469, filed on Dec. 6, 2006.

BACKGROUND OF THE INVENTION

1. Field of the Invention

The present invention relates to a flat panel display module, and more specifically, to a flat panel display module capable of reducing its exterior size efficiently.

2. Description of the Prior Art

With the improvement of technology, traditional CRT (Cathode Ray Tube) display devices have been gradually replaced by LCD (Liquid Crystal Display) devices. LCD devices are also the most widely-used display devices so far due to the non-flashing, low radiation and small size features. However, just like other electronic products, how to be lighter, thinner, and smaller is an important issue to the development of LCD devices.

Referring to FIG. 1, FIG. 1 is a sectional diagram of a flat panel display module 10 according to the prior art. The flat panel display module 10 comprises a planar display panel 12, an upper bezel 14, a lower bezel 16, a frame 18, and a backlight module 28. The upper bezel 14 and the lower bezel 16 have side walls 20 and 22 respectively. The backlight module 28 is disposed under the planar display panel 12. The frame 18 is disposed under the planar display panel 12 and outside the backlight module 28. The frame 18 comprises a side wall 24 and a panel-positioning component 26 connected to the side wall 24. The panel-positioning component 26 is disposed between a side of the planar display panel 12 and the side wall 22 of the lower bezel 16 for fixing the planar display panel 12. Both the upper bezel 14 and the lower bezel 16 are disposed outside the planar display panel 12 and the frame 18. The side wall 20 and the side wall 22 are overlapped with each other for covering the planar display panel 12 and the frame 18. Therefore, the thickness extending outwardly from the side of the planar display panel 12 is the sum of the thicknesses of the panel-positioning component 26, the side wall 20 and the side wall 22, and the clearance therein. As a result, the assembly according to the prior art does not help reduce the entire size of the flat panel display module.

SUMMARY OF THE INVENTION

Therefore, the present invention provides a flat panel display module having a frame, an upper bezel, and a lower bezel with special design to solve the problem mentioned above.

The present invention provides a flat panel display module comprising a planar display panel, a frame, a lower bezel, an upper bezel, and a backlight module. The planar display panel is a liquid crystal display panel. The frame is disposed under the planar display panel, and the frame includes at least one side wall and at least one fixing plate. The outer surface of the side wall includes a plurality of tenons, wherein at least a portion of the tenons and another portion of the tenons are disposed at different horizontal levels of the side wall of the frame. The fixing plate is connected to the side wall of the frame and directly contacted with a side of the planar display panel. The lower bezel is disposed under the planar display panel and outside the frame, and a side wall of the lower bezel includes at least one first hole corresponding to a first tenon among the plurality of tenons of the side wall so as to fix the first tenon in the first hole, wherein the side wall of the lower bezel extends upwardly from the lower bezel disposed under the planar display panel. The upper bezel is disposed above and outside the planar display panel, and a side wall of the upper bezel includes at least one second hole corresponding to a second tenon among the plurality of tenons of the side wall so as to fix the second tenon in the second hole, wherein the side wall of the upper bezel extends downwardly from the upper bezel disposed above the planar display panel. The backlight module is disposed inside the frame.

Because the upper and lower bezels of the flat panel display module according to the present invention are engaged with the frame directly through the tenons, the upper and lower bezels are not overlapped with each other so that the thickness of the flat panel display module can be reduced. In addition, the frame of the flat panel display module according to the present invention has a fixing plate to protect the planar display panel, so the fixing plate can be exposed outside the flat panel display module without being protected by the bezel. As a result, the entire size of the flat panel display module can be further reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
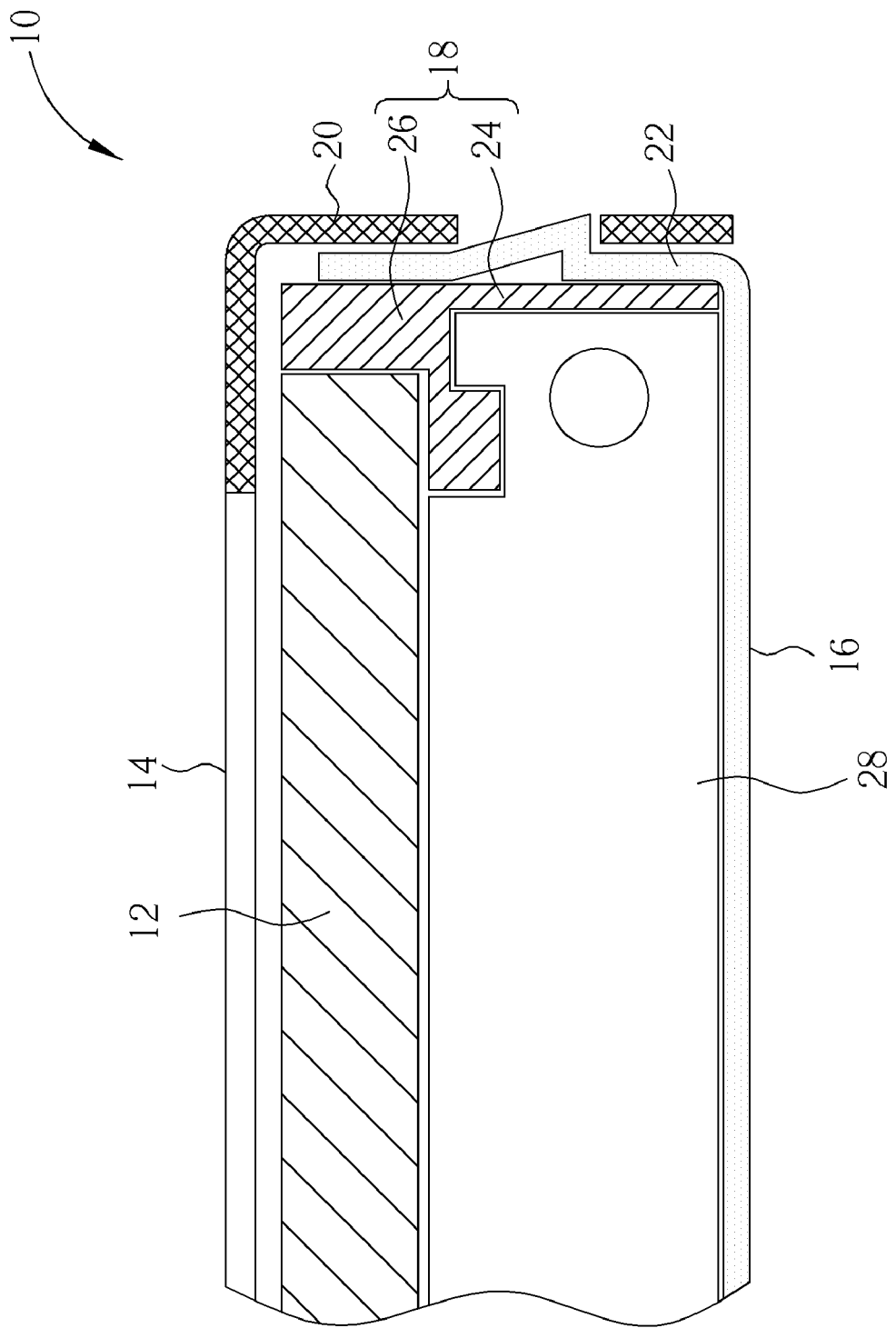
FIG. 1 is a sectional diagram of a flat panel display module according to the prior art.
Figure 2:
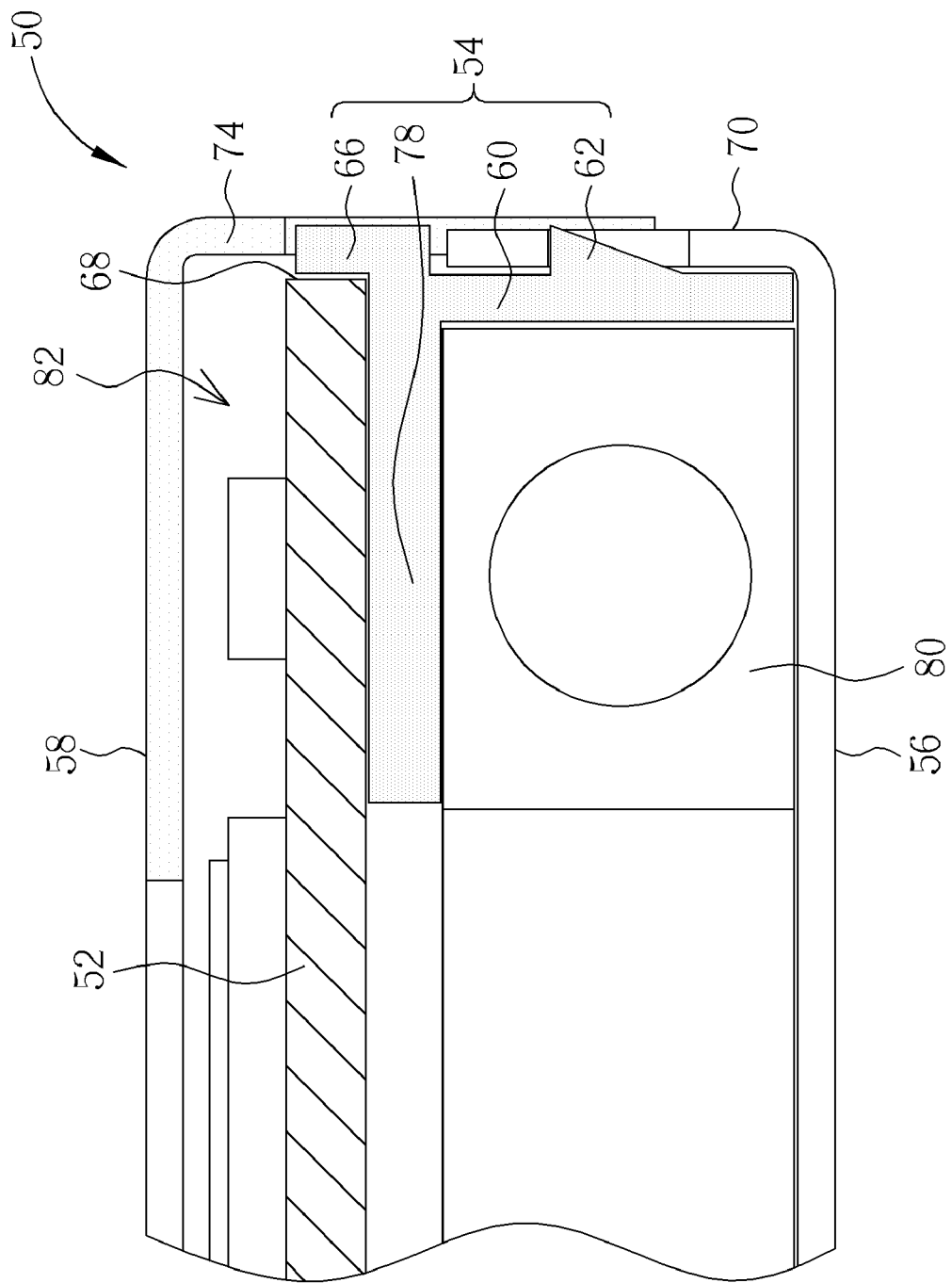
FIG. 2 is a sectional diagram of a flat panel display module according to the first embodiment of the present invention.
Figure 3:
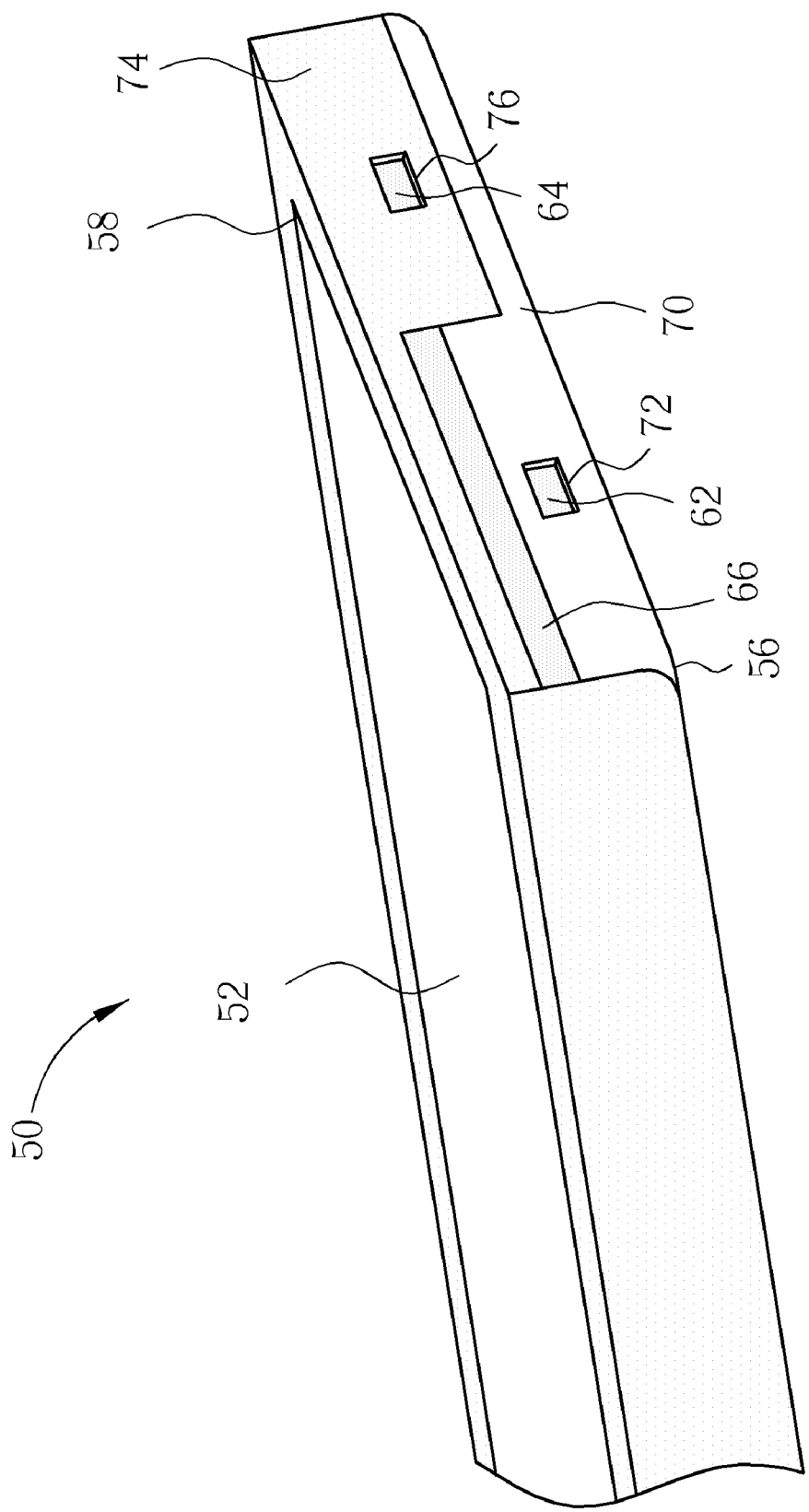
FIG. 3 is a side structure diagram of the flat panel display module in FIG. 2.

Referring to FIG. 2 and FIG. 3, FIG. 2 is a sectional diagram of a flat panel display module 50 according to the first embodiment of the present invention, and FIG. 3 is a side structure diagram of the flat panel display module 50 in FIG. 2. The flat panel display module 50 comprises a planar display panel 52, a frame 54 disposed under the planar display panel 52, a lower bezel 56 disposed outside the frame 54, and an upper bezel 58 disposed outside the planar display panel 52. The planar display panel 52 can be an LCD panel. The upper bezel 58 and the lower bezel 56 can be made of plastic or metal material. The frame 54 comprises a side wall 60. The outer surface of the side wall 60 comprises two tenons 62 and 64 (as shown in FIG. 3) and a fixing plate 66 connected to the side wall 60. The fixing plate 66 has a functionality of baffle and is contacted with a side 68 of the planar display panel 52 directly. The lower bezel 56 has a side wall 70. The side wall 70 comprises a first hole 72 corresponding to the tenon 62 so as to fix the tenon 62 in the first hole 72. The upper bezel 58 has a side wall 74. The side wall 74 comprises a second hole 76 corresponding to the tenon 64 so as to fix the tenon 64 in the second hole 76. The frame 54 further comprises a panel-positioning board 78 connected to the side wall 60. The panel-positioning board 78 and the fixing plate 66 together form a containing space 82 for containing and fixing the planar display panel 52. Therefore, the panel-positioning board 78 and the fixing plate 66 directly contact the planar display panel 52 positioned inside the containing space 82. The thickness of the fixing plate 66 can be thicker than the thickness of the side wall 74 for preventing the side 68 of the planar display panel 52 from being contacted with the side wall 74 of the upper bezel 58 so as to protect the planar display panel 52. Moreover, the flat panel display module 50 further comprises a backlight module 80 disposed under the planar display panel 52 and fixed inside the frame 54 for supplying the planar display panel 52 with a backlight source.

Referring to FIG. 2 and FIG. 3 again, more detailed description for the connection of the fixing plate 66, the lower bezel 56, and the upper bezel 58 will be provided. The fixing plate 66 is exposed between the lower bezel 56 and the upper bezel 58 and is protruded from the side wall 60. The fixing plate 66, the tenons 62 and 64, and the side walls 74 and 70 are located in a same vertical plane. That is to say, the side walls 74 and 70 are alternatively interlaced and are disposed outside the side wall 60 rather than overlapped with each other, and the fixing plate 66 is vertically sandwiched in between the upper bezel 58 and the lower bezel 56. Therefore, the lower bezel 56 surrounds the frame 54, the side wall 60 of the frame 54 is encircled by the side wall 70 of the lower bezel 56, and the frame 54 is positioned vertically between the upper bezel 58 and the lower bezel 56. Furthermore, the upper and lower sides of the fixing plate 66 are contacted with the side walls 74 and 70 respectively. In such a manner, the upper bezel 58 and the lower bezel 56 can utilize the engagement of the tenon 62 and the first hole 72 and the engagement of the tenon 64 and the second hole 76 to cover the planar display panel 52, the frame 54, the panel-positioning board 78 and the backlight module 80. As mentioned above, the fixing plate 66, the tenons 62 and 64, and the side walls 74 and 70 are located in the same vertical plane. As a result, the thickness extending outwardly from the side 68 of the planar display panel 52 is reduced to only the thickness of the fixing plate 66.

Figure 4:
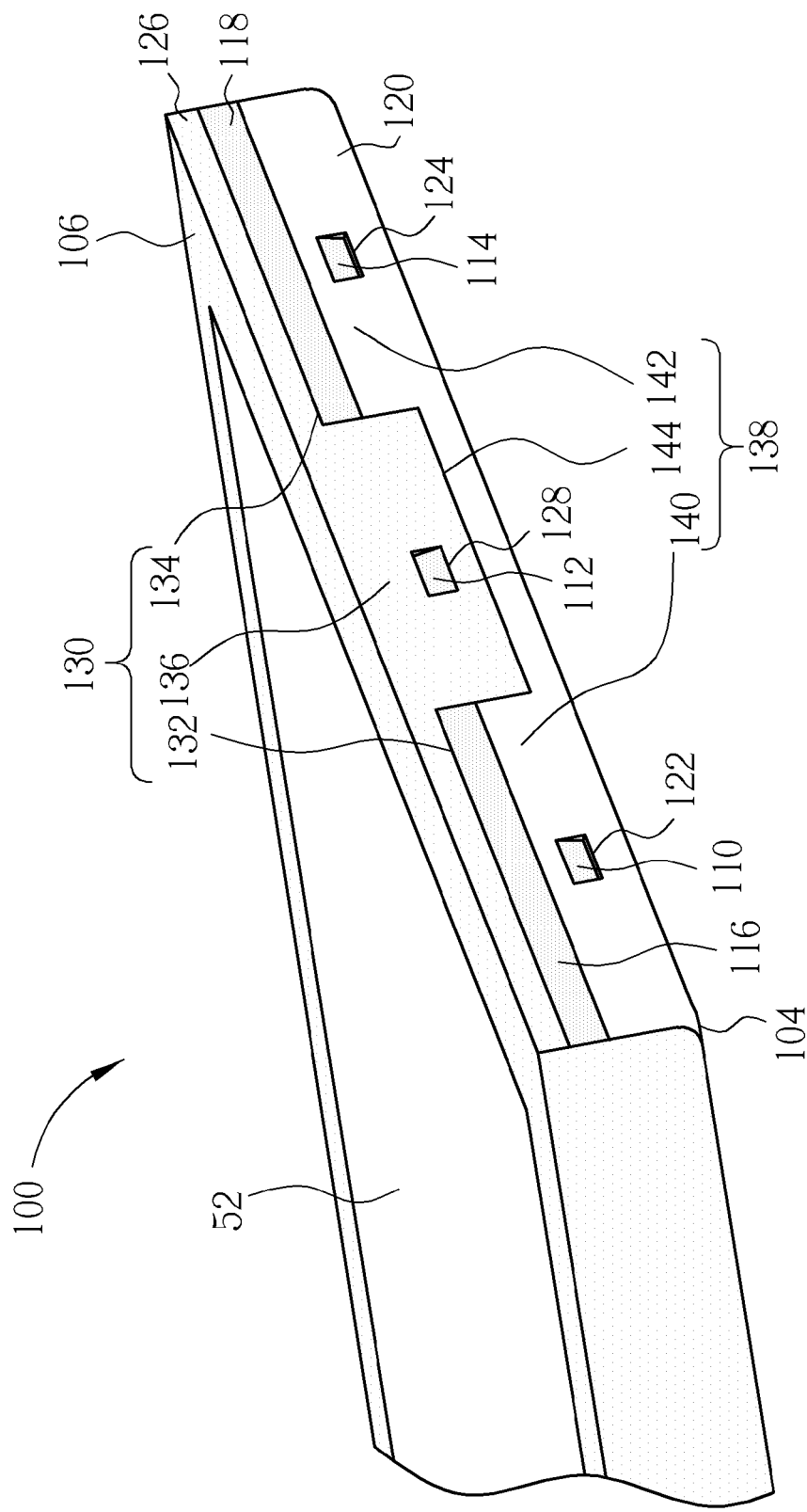
FIG. 4 is a side structure diagram of a flat panel display module according to the second embodiment of the present invention.
Figure 5:
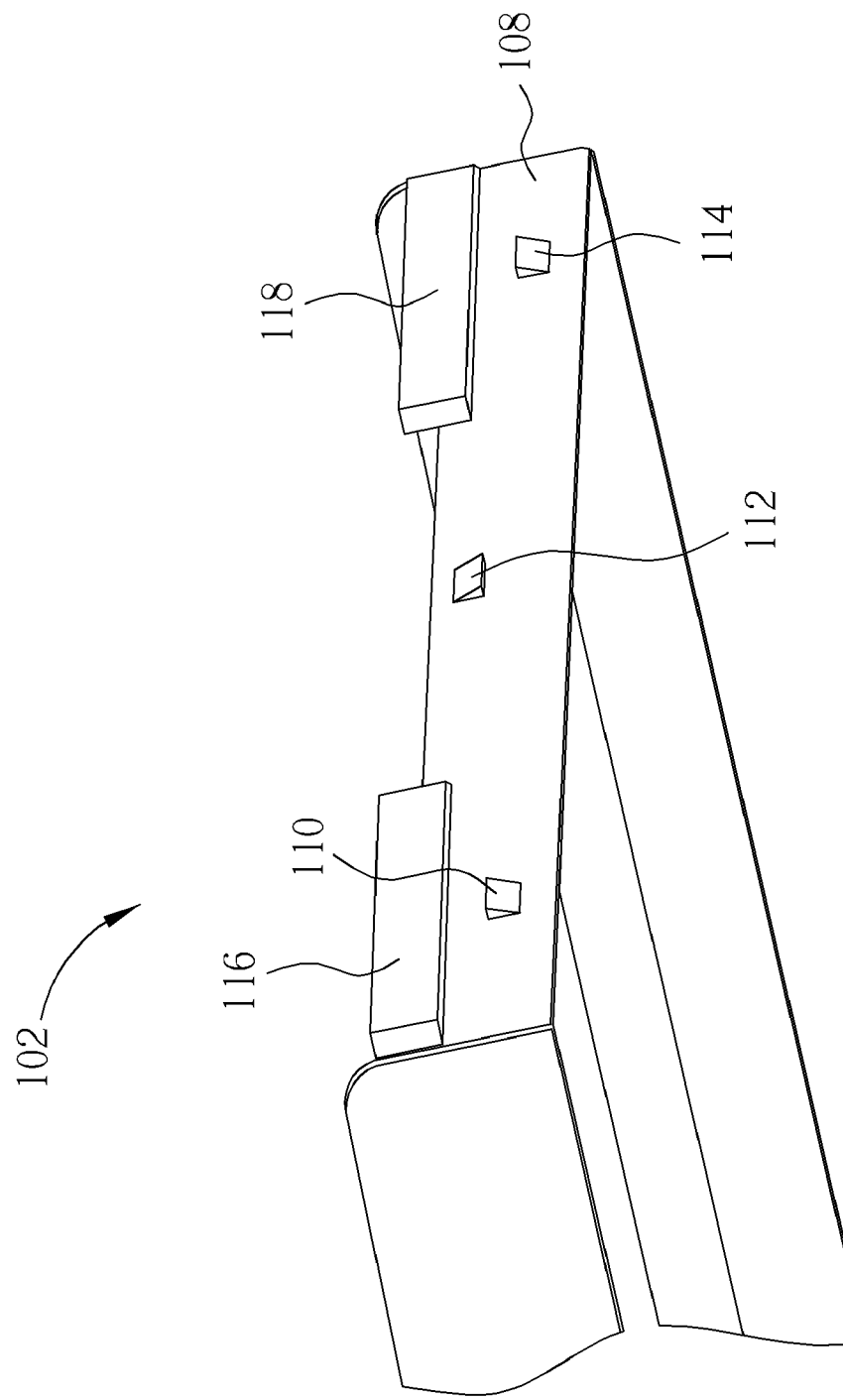
FIG. 5 is a structural diagram of the frame of the flat panel display module according to the second embodiment of the present invention.

Referring to FIG. 4, FIG. 4 is a side structure diagram of a flat panel display module 100 according to the second embodiment of the present invention. Differences between the flat panel display module 50 in the first embodiment and the flat panel display module 100 include bezel structure and number of fixing plates (also known as baffles), holes, and tenons. Components mentioned in both the first and second embodiments represent components with similar functions or similar positions. The display module 100 comprises a frame 102 (not shown in FIG. 4) disposed under the planar display panel 52, a lower bezel 104 disposed outside the frame 102, and an upper bezel 106 disposed outside the planar display panel 52. Referring to FIG. 5, FIG. 5 is a structural diagram of the frame 102 of the flat panel display module 100 according to the second embodiment of the present invention. The frame 102 comprises a side wall 108. The outer surface of the side wall 108 comprises a plurality of tenons and fixing plates. The second embodiment only shows the frame 102 has three tenons (110, 112, 114) and two fixing plates (116, 118). The fixing plates 116 and 118 are contacted with the side 68 of the planar display panel 52. The frame 102 can further comprise a plurality of side walls besides the side wall 108 for forming a containing space with the side wall 108 to fix the backlight module 80 inside the flat panel display module 100.

In addition, the lower bezel 104 has a side wall 120. The side wall 120 comprises two first holes 122 and 124 corresponding to the tenons 110 and 114 respectively so as to fix the tenons 110 and 114 in the first holes 122 and 124 respectively. The side wall 120 further comprises a tooth structure 138. The tooth structure 138 has two teeth 140 and 142, and a groove 144. The upper bezel 106 has a side wall 126. The side wall 126 comprises a second hole 128 corresponding to the tenon 112 so as to fix the tenon 112 in the second hole 128. The side wall 126 of the upper bezel 106 has a tooth structure 130. The tooth structure 130 has two grooves 132 and 134, and a tooth 136 wherein the tooth 136 is disposed between the fixing plates (also known as baffles) 116 and 118. The teeth 136, 140, 142 and the grooves 144, 132, 134 are alternatively interlaced so as to combine the tooth structure 130 and the tooth structure 138. The fixing plate 116 is located between the groove 132 and the tooth 140, and the fixing plate 118 is located between the groove 134 and the tooth 142. In such a manner, the upper bezel 106 and the lower bezel 104 can utilize the engagements of the tenons (110, 112, 114) and the holes (122, 124, 128) to cover the planar display panel 52, the frame 102, the panel-positioning board 78 and the backlight module 80. And as mentioned above, the fixing plates 116, 118, the tenons 110, 112, 114, the side wall 126, and the side wall 120 are located in the same vertical plane. As a result, the thickness extending outwardly from the side 68 of the planar display panel 52 is also reduced to only the thickness of the fixing plate 116 or 118, or the thickness of the side wall 126.

It should be mentioned that the number of grooves and teeth on the tooth structures 130, 138, holes on the upper bezel 106 and the lower bezel 104, and fixing plates and tenons on the frame 102 is not limited to the number mentioned in the second embodiment and can change according to the screen size of the flat panel display module. That is to say, the number of grooves and teeth on the tooth structures 130 and 138 can increase with the screen size of the flat panel display module. And the number of holes, fixing plates and tenons can also increase correspondingly. In such a manner, the upper bezel 106 and the lower bezel 104 can utilize the engagement of the tooth structure 130 and the tooth structure 138 and the engagement of the tenons and the holes to cover the planar display panel 52, the frame 54, the panel-positioning board 78 and the backlight module 80.

Figure 6:
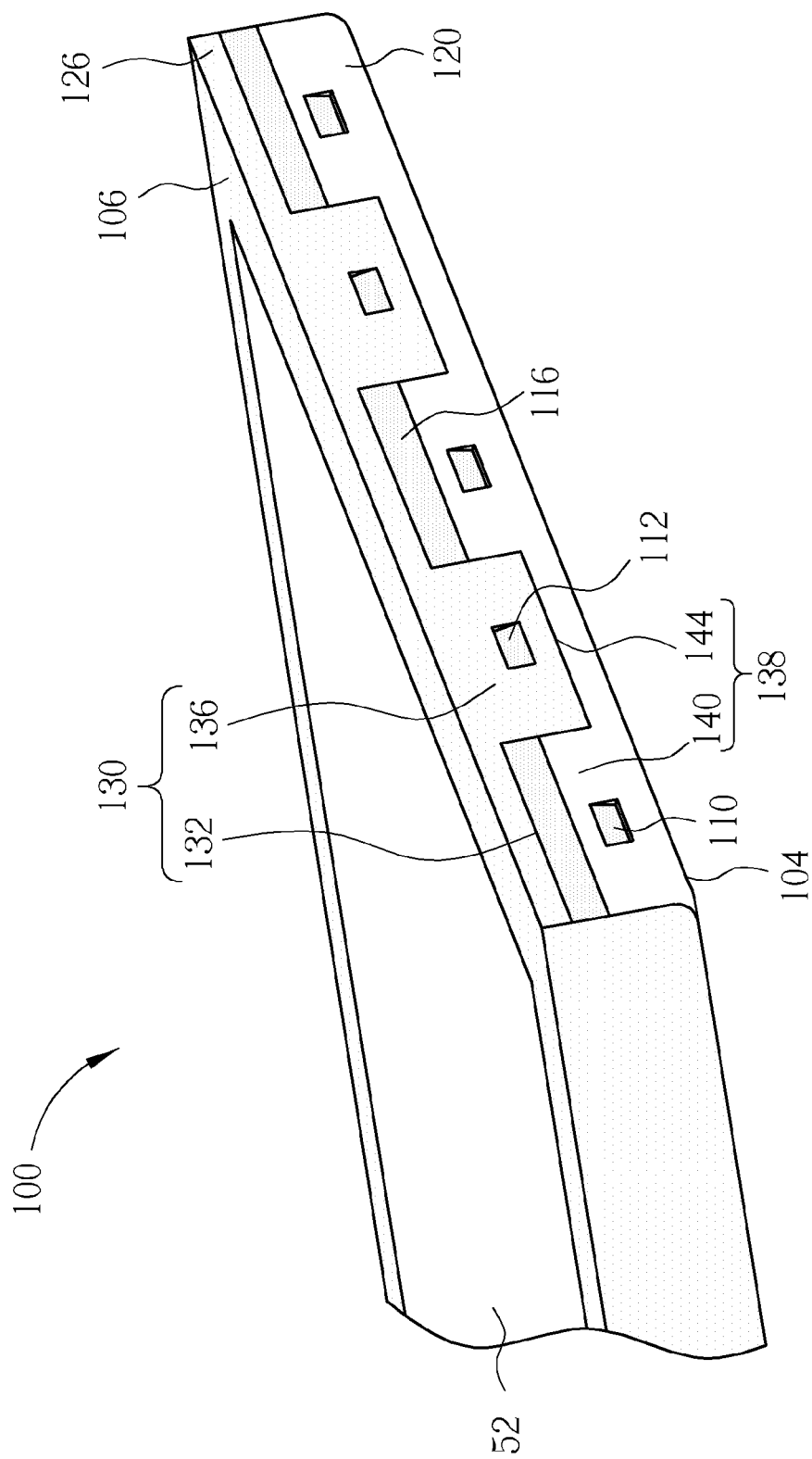
FIG. 6 is a side structure diagram of a flat panel display module according to the third embodiment of the present invention.
Figure 7:
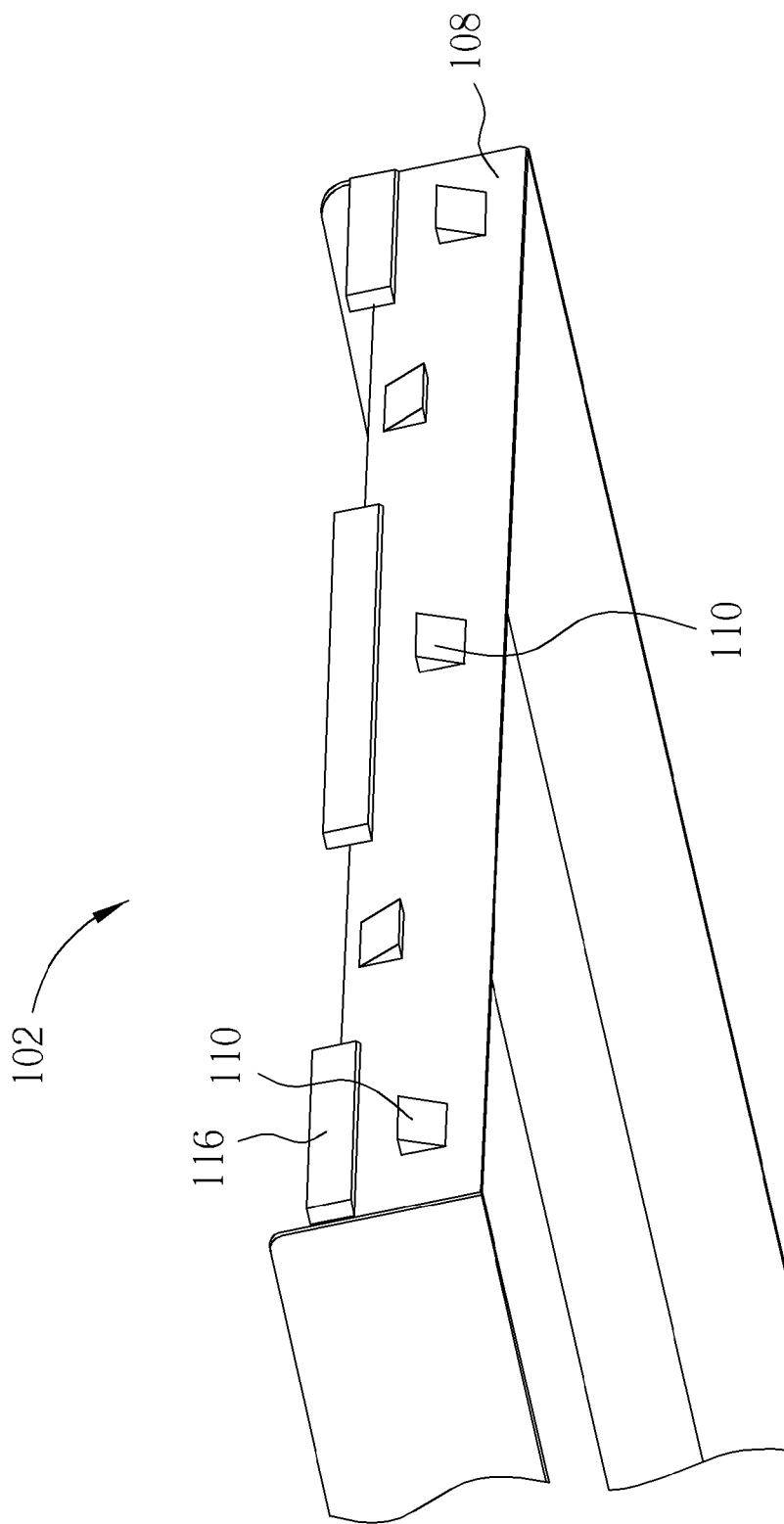
FIG. 7 is a side structure diagram of the frame of the flat panel display module according to the third embodiment of the present invention.

For example, referring to FIG. 6 and FIG. 7, FIG. 6 is a side structure diagram of a flat panel display module 100 according to the third embodiment of the present invention, and FIG. 7 is a side structure diagram of the frame 102 of the flat panel display module 100 according to the third embodiment of the present invention. The numerals given to each element in FIGS. 6-7 are the same as that in FIGS. 4-5. In this embodiment, the flat panel display module 100 can be applied to display devices of bigger size. Therefore, the number of grooves and teeth on the tooth structures 130 and 138 is greater than those in the second embodiment. As shown in FIG. 6, the tooth structure 130 of the upper bezel 106 comprises three grooves 132 and two teeth 136, and the tooth structure 138 of the lower bezel 104 comprises three teeth 140 and two grooves 144 corresponding to the grooves 132 and the teeth 136 respectively to cover the side wall 108. The side wall 108 comprises five tenons 110 engaged with the teeth 136 and 140 respectively to fix the teeth 136 and 140 on the side wall 108. The fixing plate 116 protruded from the side wall 108 is exposed between the teeth 140 and the grooves 132. Furthermore, in this embodiment, the sizes of the teeth 136 and 140 can be not the same as one another.

Figure 8:
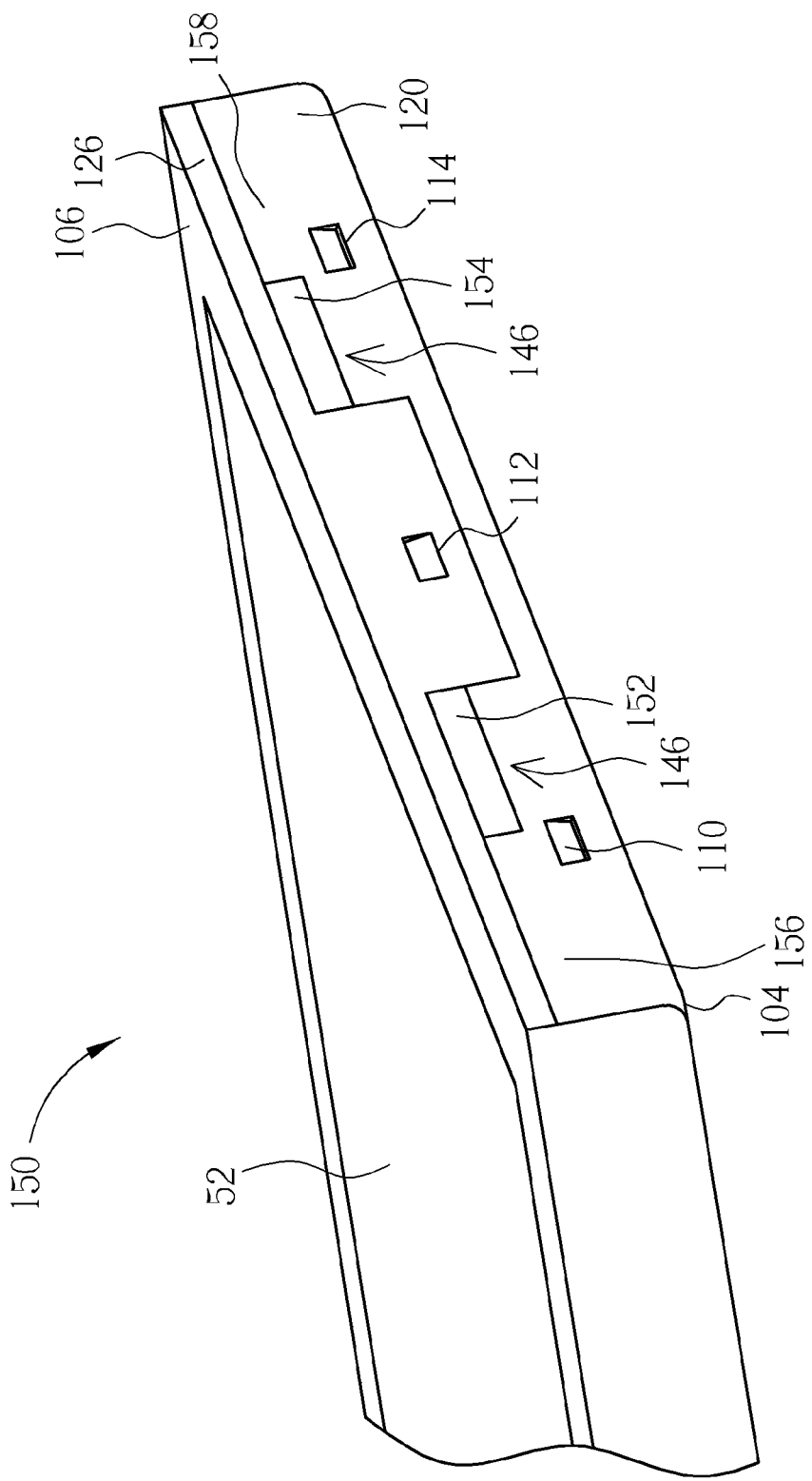
FIG. 8 is a side structure diagram of a flat panel display module according to the fourth embodiment of the present invention.

Referring to FIG. 8, FIG. 8 is a side structure diagram of a flat panel display module 150 according to the fourth embodiment of the present invention. Differences between the flat panel display module 150 and the flat panel display module 100 in the second embodiment include lower bezel and fixing plate structures. Components mentioned in the first, second and fourth embodiments represent components with similar functions or similar positions. The flat panel display module 150 comprises the frame 102 (not shown in FIG. 8), the lower bezel 104 and the upper bezel 106. The frame 102 comprises two fixing plates 152 and 154 connected to the side wall 108. The fixing plates 152 and 154 are shorter than the fixing plates 116 and 118 in length. The lower bezel 104 comprises two teeth 156 and 158. The teeth 156 and 158 have sunken portions 146 corresponding to the shape of the fixing plates 152 and 154 respectively to form containing spaces for containing the fixing plates 152 and 154. And because the fixing plates 152 and 154, the tenons 110, 112, 114, the side wall 126, and the side wall 120 are located in the same vertical plane, the thickness extending outwardly from the side 68 of the planar display panel 52 is also reduced to only the thickness of the fixing plate 152 or 154, or the thickness of the side wall 126.

Compared with the prior art, the present invention utilizes the engagement of the upper bezel, the lower bezel and the fixing plate and the engagement of the tenons and the holes to reduce the size of the flat panel display module, so the thickness extending outwardly from the side of the flat panel module is reduced from the thicknesses of the fixing plate and the side walls on the upper and lower bezels down to the thickness of the fixing plate or the upper bezel. In such a manner, the thickness extending outwardly from the planar display panel can be reduced efficiently so as to make the entire size of the flat panel display module much smaller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flat panel display module comprising:
    a planar display panel, wherein the planar display panel is a liquid crystal display panel;
    a frame disposed under the planar display panel comprising:
        at least one side wall, the outer surface of the side wall comprising a plurality of tenons, wherein at least a portion of the tenons and another portion of the tenons are disposed at different horizontal levels of the side wall of the frame; and
        at least one fixing plate connected to the side wall of the frame and directly contacted with a side of the planar display panel;
    a lower bezel disposed under the planar display panel and outside the frame, a side wall of the lower bezel comprising at least one first hole corresponding to a first tenon among the plurality of tenons of the side wall so as to fix the first tenon in the first hole, wherein the side wall of the lower bezel extends upwardly from the lower bezel disposed under the planar display panel;
    an upper bezel disposed above and outside the planar display panel, a side wall of the upper bezel comprising at least one second hole corresponding to a second tenon among the plurality of tenons of the side wall so as to fix the second tenon in the second hole, wherein the side wall of the upper bezel extends downwardly from the upper bezel disposed above the planar display panel, and upper and lower sides of the fixing plate are contacted with the side walls of the upper and lower bezels respectively; and
    a backlight module disposed inside the frame.

2. The flat panel display module of claim 1, wherein the fixing plate is exposed between the upper bezel and the lower bezel.

3. The flat panel display module of claim 2, wherein the fixing plate is vertically sandwiched in between the upper bezel and the lower bezel.

4. The flat panel display module of claim 1, wherein the fixing plate is vertically protruded from an upper surface of the side wall of the frame.

5. The flat panel display module of claim 3, wherein the side walls of the upper and lower bezels, the plurality of tenons, and the fixing plate are located in a same vertical plane.

6. The flat panel display module of claim 1, wherein side walls of the lower and upper bezels are not overlapped with each other.

7. The flat panel display module of claim 1, wherein side walls of the upper and lower bezels are alternatively interlaced and are disposed outside the side wall of the frame.

8. The flat panel display module of claim 7, wherein the side walls of the upper and lower bezels have tooth structures respectively so as to be alternatively interlaced with each other.

9. The flat panel display module of claim 8, wherein the tooth structure of the upper bezel comprises at least one groove and the tooth structure of the lower bezel comprises at least one tooth, the fixing plate being disposed between the groove and the tooth.

10. The flat panel display module of claim 8, wherein the tooth structure of the lower bezel comprises at least one tooth and the tooth has a sunken portion corresponding to a shape of the fixing plate for containing the fixing plate.

11. The flat panel display module of claim 1, wherein the frame further comprises a panel-positioning board connected to the side wall of the frame, and the panel-positioning board and the fixing plate together form a containing space for containing and fixing the planar display panel.

12. The flat panel display module of claim 11, wherein the panel-positioning board and the fixing plate directly contact the planar display panel positioned inside the containing space.

13. The flat panel display module of claim 1, wherein the frame comprises a plurality of fixing plates.

14. The flat panel display module of claim 13, wherein the side wall of the upper bezel is disposed between two fixing plates among the plurality of fixing plates of the frame.

15. The flat panel display module of claim 1, wherein the upper and lower bezels are made of plastic or metal material.

16. The flat panel display module of claim 1, wherein the lower bezel surrounds the frame, the side wall of the frame is encircled by the side wall of the lower bezel, and the frame is positioned vertically between the upper bezel and the lower bezel.

17. The flat panel display module of claim 1, wherein the lower bezel and the upper bezel are two independent structures structurally separated from each other.

18. The flat panel display module of claim 1, wherein the fixing plate and the lower bezel are two independent structures structurally separated from each other.

19. A flat panel display module comprising:
- a planar display panel, wherein the planar display panel is a liquid crystal display panel;
- a frame disposed under the planar display panel comprising:
    - at least one side wall, the outer surface of the side wall comprising a plurality of tenons, wherein at least a portion of the tenons and another portion of the tenons are disposed at different horizontal levels of the side wall of the frame; and
    - at least one fixing plate connected to the side wall of the frame and directly contacted with a side of the planar display panel;
- a lower bezel disposed under the planar display panel and outside the frame, a side wall of the lower bezel comprising at least one first hole corresponding to a first tenon among the plurality of tenons of the side wall so as to fix the first tenon in the first hole, wherein the side wall of the lower bezel extends upwardly from the lower bezel disposed under the planar display panel;
- an upper bezel disposed above and outside the planar display panel, a side wall of the upper bezel comprising at least one second hole corresponding to a second tenon among the plurality of tenons of the side wall so as to fix the second tenon in the second hole, wherein the side wall of the upper bezel extends downwardly from the upper bezel disposed above the planar display panel, the side walls of the upper and lower bezels have tooth structures respectively so as to be alternatively interlaced with each other, the tooth structure of the upper bezel comprises at least one groove, the tooth structure of the lower bezel comprises at least one tooth, and the fixing plate is disposed between the groove and the tooth; and
- a backlight module disposed inside the frame.

20. A flat panel display module comprising:
- a planar display panel, wherein the planar display panel is a liquid crystal display panel;
- a frame disposed under the planar display panel comprising:
    - at least one side wall, the outer surface of the side wall comprising a plurality of tenons, wherein at least a portion of the tenons and another portion of the tenons are disposed at different horizontal levels of the side wall of the frame; and
    - at least one fixing plate connected to the side wall of the frame and directly contacted with a side of the planar display panel;
- a lower bezel disposed under the planar display panel and outside the frame, a side wall of the lower bezel comprising at least one first hole corresponding to a first tenon among the plurality of tenons of the side wall so as to fix the first tenon in the first hole, wherein the side wall of the lower bezel extends upwardly from the lower bezel disposed under the planar display panel;
- an upper bezel disposed above and outside the planar display panel, a side wall of the upper bezel comprising at least one second hole corresponding to a second tenon among the plurality of tenons of the side wall so as to fix the second tenon in the second hole, wherein the side wall of the upper bezel extends downwardly from the upper bezel disposed above the planar display panel, the side walls of the upper and lower bezels have tooth structures respectively so as to be alternatively interlaced with each other, the tooth structure of the lower bezel comprises at least one tooth, and the tooth has a sunken portion corresponding to a shape of the fixing plate for containing the fixing plate; and
- a backlight module disposed inside the frame.

21. A flat panel display module comprising:
- a planar display panel, wherein the planar display panel is a liquid crystal display panel;
- a frame disposed under the planar display panel comprising:
    - at least one side wall, the outer surface of the side wall comprising a plurality of tenons, wherein at least a portion of the tenons and another portion of the tenons are disposed at different horizontal levels of the side wall of the frame; and
    - a plurality of fixing plates connected to the side wall of the frame and directly contacted with a side of the planar display panel;
- a lower bezel disposed under the planar display panel and outside the frame, a side wall of the lower bezel comprising at least one first hole corresponding to a first tenon among the plurality of tenons of the side wall so as to fix the first tenon in the first hole, wherein the side wall of the lower bezel extends upwardly from the lower bezel disposed under the planar display panel;
- an upper bezel disposed above and outside the planar display panel, a side wall of the upper bezel comprising at least one second hole corresponding to a second tenon among the plurality of tenons of the side wall so as to fix the second tenon in the second hole, wherein the side wall of the upper bezel extends downwardly from the upper bezel disposed above the planar display panel, and the side wall of the upper bezel is disposed between two fixing plates among the plurality of fixing plates of the frame; and
- a backlight module disposed inside the frame.

* * * * *